May 26, 1959 R. B. WAY ET AL 2,887,985
COMBINATION PAINTING AND WIPING MACHINE
Filed Jan. 26, 1956 7 Sheets-Sheet 1

INVENTORS
Robert B. Way
Carl D. Hersey
BY
Charles L. Lorenbach
attorney

May 26, 1959 R. B. WAY ET AL 2,887,985
COMBINATION PAINTING AND WIPING MACHINE
Filed Jan. 26, 1956 7 Sheets-Sheet 3

INVENTORS
Robert B. Way
Carl D. Hersey
BY Charles L. Lovenbeck
Attorney

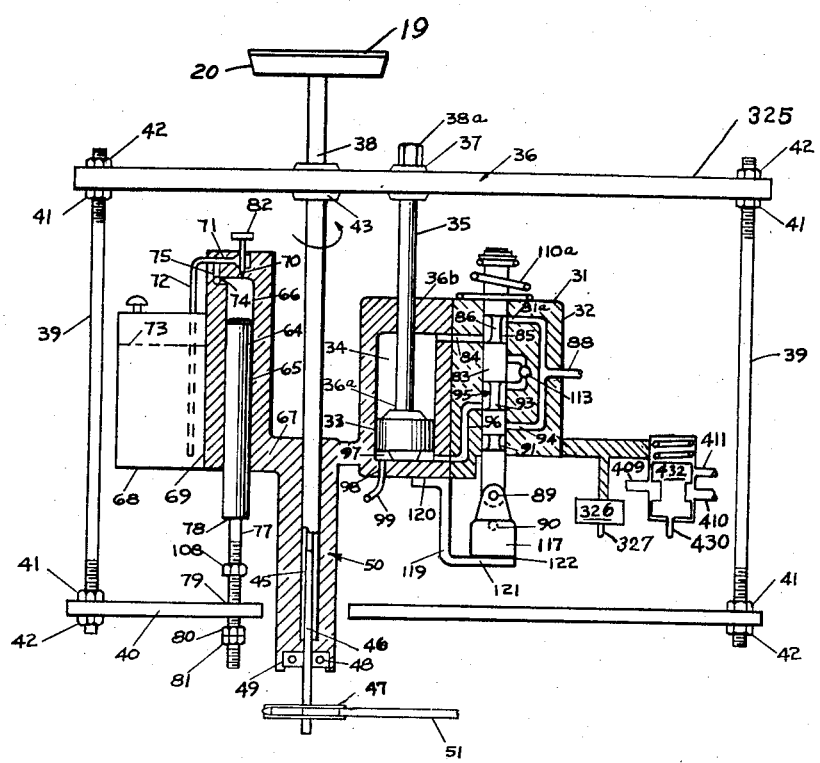

May 26, 1959 R. B. WAY ET AL 2,887,985
COMBINATION PAINTING AND WIPING MACHINE
Filed Jan. 26, 1956 7 Sheets-Sheet 6
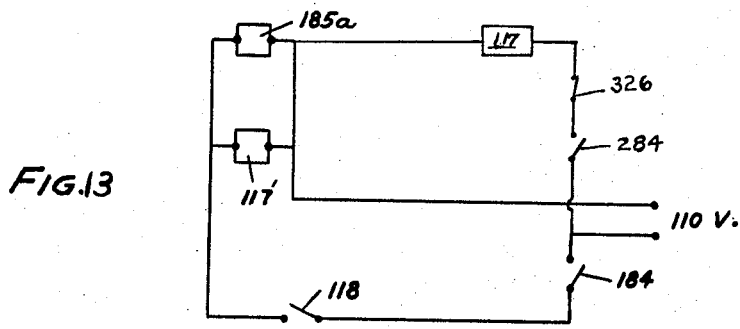
FIG.13
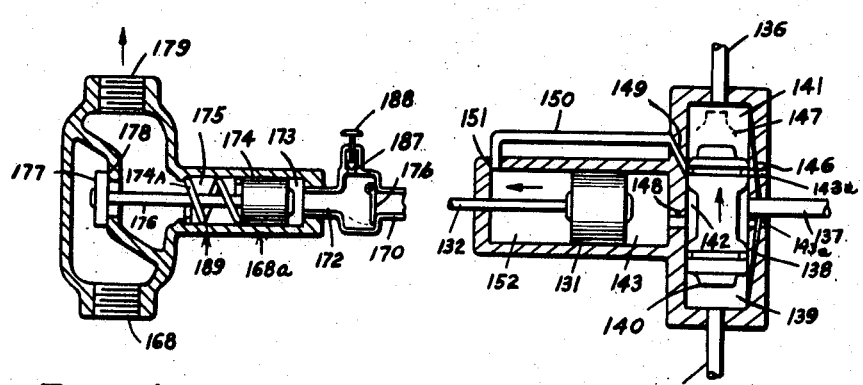
FIG.14
FIG.15
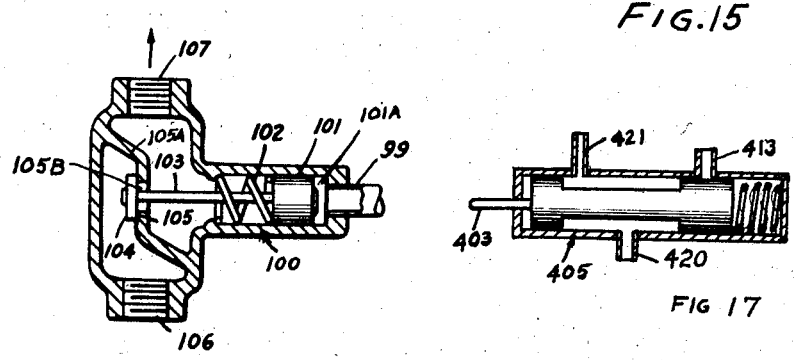
FIG.16
FIG 17
INVENTORS
Robert B. Way
Carl D. Kersey
BY
Charles L. Lovercheck
attorney

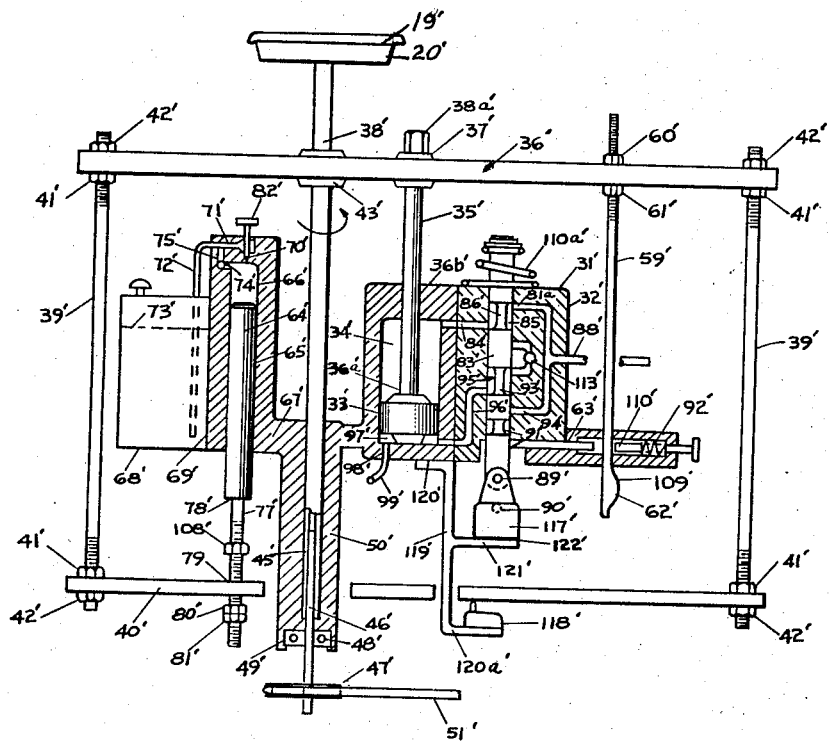

United States Patent Office 2,887,985
Patented May 26, 1959

2,887,985
COMBINATION PAINTING AND WIPING MACHINE

Robert B. Way and Carl D. Hersey, Erie, Pa.

Application January 26, 1956, Serial No. 561,468

7 Claims. (Cl. 118—106)

This invention relates to automatic painting and coating machines and more particularly to machines for coating at a rapid rate a predetermined area of an article of manufacture, keeping the area adjacent to the coated area clean of paint, or coating it with another color.

In the painting of articles of manufacture, it is frequently desirable to spray paint on a predetermined and embossed area of the article and, at the same time, keep the paint from the area surrounding the sprayed area and to subsequently polish the area around the embossed area before the paint has dried. This is particularly useful in articles which have such embossed portions thereon where it is desirable to keep the areas adjacent the embossed areas clean and polished.

In the machine disclosed herein, a means is provided for rotating the article while it is being painted with a provision to support a paint mask over the article. Means is also provided to move the gun during the painting operation in order to provide a uniform distribution of paint over the surface of the article. At a wiping or polishing station, means is provided for automatically wiping the excess paint from the article and, between these two stages, a position is provided where the paint can be allowed to dry somewhat before it passes to the wiping station where the excess paint is wiped from the article. This makes it possible to perform the painting and wiping operation without unloading. The machine is so laid out that the loading station is directly beside the unloading station and an operator can reach both whereby he can load parts with one hand and unload with the other hand.

It is, accordingly, an object of this invention to provide a painting and wiping machine which is simple in construction, economical to manufacture, and simple and efficient in operation.

Another object of this invention is to provide a machine for automatically applying paint to an article of manufacture, moving the paint gun as the paint is applied, and rotating the article as paint is being applied thereto.

Another object of the invention is to provide an indexed circular table with article supports thereon and lifting devices to lift articles into engagement with masks supported on a painting machine.

A further object of the invention is to provide a machine having at least two devices thereon, one under the wiping portion and one under the painting portion for the devices to rotate articles while they are being painted and, also, during wiping and polishing.

A further object of this invention is to provide an improved wiping and polishing machine in combination with an improved painting machine.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 10 is an enlarged view of an oscillating device for an article according to the invention;

Fig. 11 is an end view of the device shown in Fig. 10;

Fig. 12 is an enlarged view of the internal piping of the lifting device shown in Fig. 7;

Fig. 13 shows an electrical circuit for operating the solenoid actuating member for the device shown in Fig. 12;

Fig. 14 is a detailed view of one of the valves used according to the invention;

Fig. 15 is a longitudinal cross sectional view of the wiping cloth actuating member according to the invention;

Fig. 16 is a cross sectional view of another valve;

Fig. 17 is a cross sectional view of the valves which prevent air from flowing to the index mechanism unless both rotary power units are in the down position;

Fig. 18 is an enlarged view of the rotating mechanism for the wiping station;

Fig. 19 is a schematic view of the wiping station rotary power unit valve arrangement; and Fig. 20 is an enlarged view of the cam and index valve according to the invention.

Figure 1:
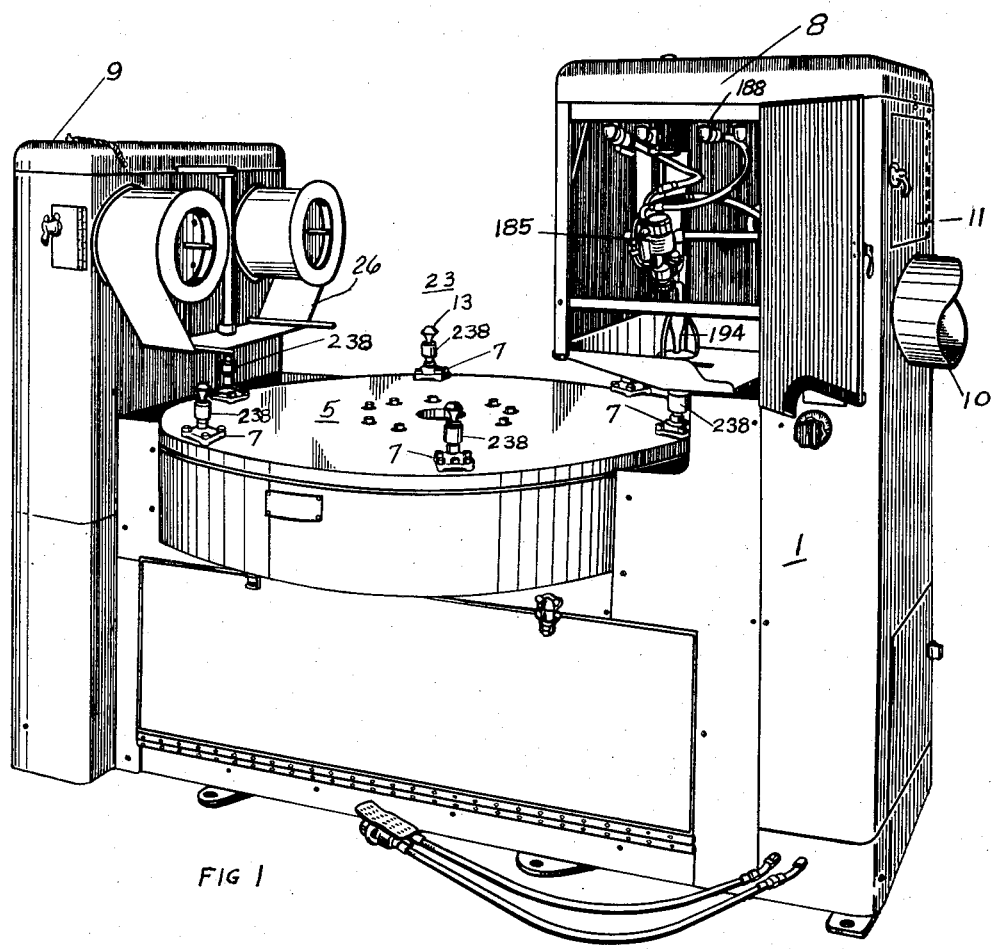
Fig. 1 is an isometric view of a machine according to the invention.
Figure 3:
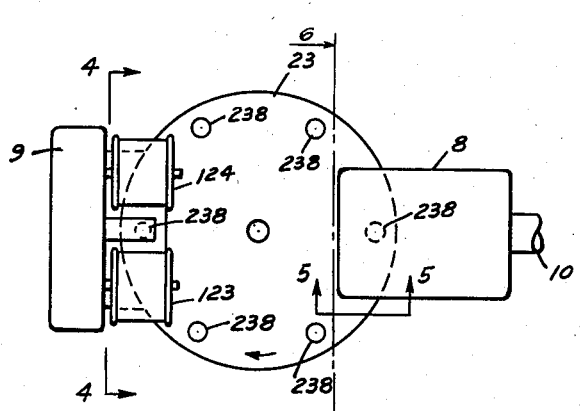
Fig. 3 is a top view of the machine shown in Figs. 1 and 2.
Figure 1A:
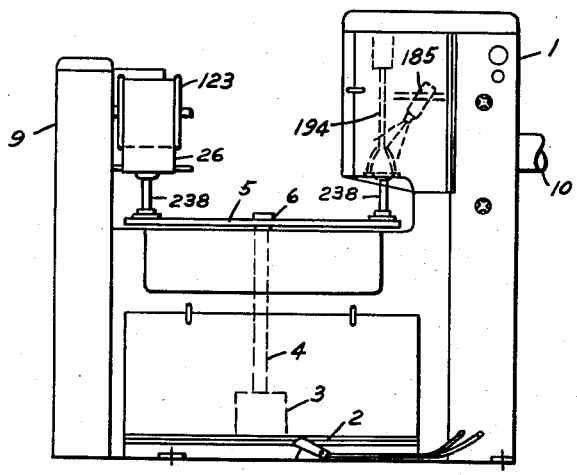
Fig. 1A is a side view of the painting machine according to the invention.
Figure 2:
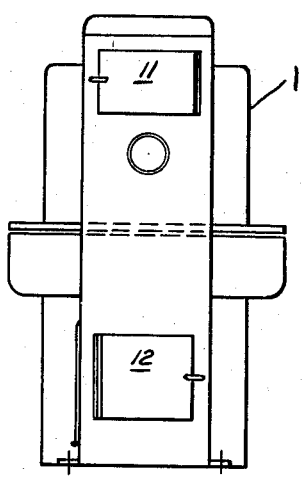
Fig. 2 is an end view of the machine shown in Fig. 1.
Figure 4:
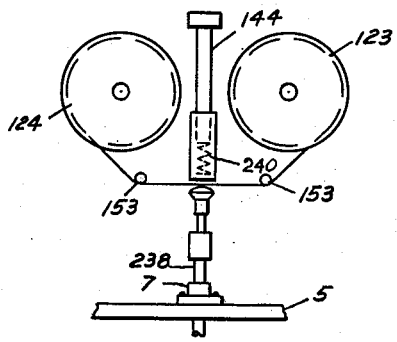
Fig. 4 is an enlarged view of the machine taken on line 4—4 of Fig. 3.
Figure 9:
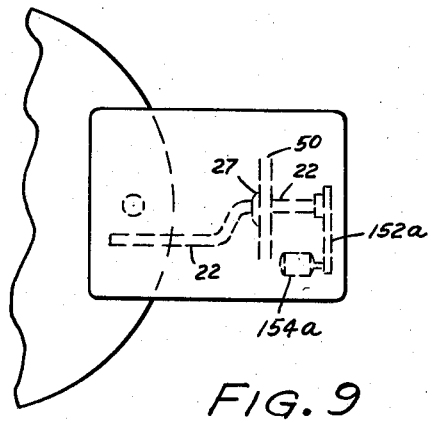
Fig. 9 is a top view of the paint gun support shown in Fig. 5.
Figure 6:
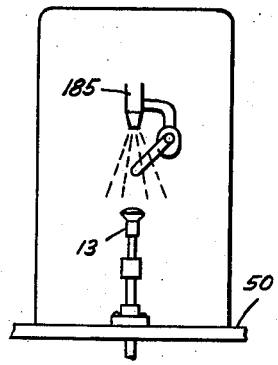
Fig. 6 is a view taken on line 6—6 of Fig. 3.

Now with more specific reference to the drawings, a machine frame 1 is shown having a base 2 with a drive 3 supported thereon. The drive 3 is connected through a shaft 4 with a table 5 at 6. The shaft 4 with the table 5 thereon is supported on the machine frame 1 by means of bearings. The table 5 has a plurality of spindles 238 freely rotatable therein in bearings 7 which are fixed to the table 5. The spindles 238 are equally spaced around the table 5 adjacent the periphery thereof as shown in Figs. 1 and 3.

On opposite sides of the machine 1, enclosures 8 and 9 are disposed. The enclosure 8 houses paint spray guns 185 and a mask support 194 shown in Fig. 1 as well as an exhaust vent 10 in which a blower operates to exhaust paint fumes caused by the guns 185. The enclosure 9 houses the mechanism for controlling a wiping cloth 26 more specifically shown in Figs. 1 and 19. An access door 11 and another door 12 are provided in the enclosure 8 which are accessed to the mask circuit and the equipment contained therein. Similar access doors will be provided in the enclosure 9.

Table

The table 5 is supported on the shaft 4 fastened thereto at 6 and has the upwardly extending spindles 238 extending therethrough. The spindles 238 are journalled and freely rotatable in the bearings 7 and extend upwardly and have an article support 13 attached thereto which will have an upper shape which is the counterpart of the lower portion of the article to be painted. The upper spindle and mask support 194 will support a mask 14 which will be in the shape of a counterpart of the article being painted and the mask 14 will engage the article when the spindle 238 is urged upwardly by rotary power units 25 and 25'. The rotary power units 25 and 25' are shown in greater detail in Fig. 12. The spindles 238 also slide vertically in the bearings 7 and are urged to a lowermost position by a compression spring 16 which is disposed concentric to a downwardly extending portion 17 of the spindle 238 and disposed between the bearing 7 and a sleeve 15.

A leather washer 18 is fixedly attached to the lower end 17 of the spindle 238 and the washer 18 makes frictional contact with a similar leather washer 19 on an upwardly extending shaft 38. A tip 243 of the end 17 moves into an opening in the center of the washer 19 to centrally locate the spindle 238. Therefore, when the table 5 has indexed the spindles 238 to the position shown in Figs. 1 and 3, one of the spindles 238 will be directly under the mask support 194 and another spindle 238 diametrically opposite on the table 5 will be under a backup member 195 and also under a cloth 26.

Figure 5:
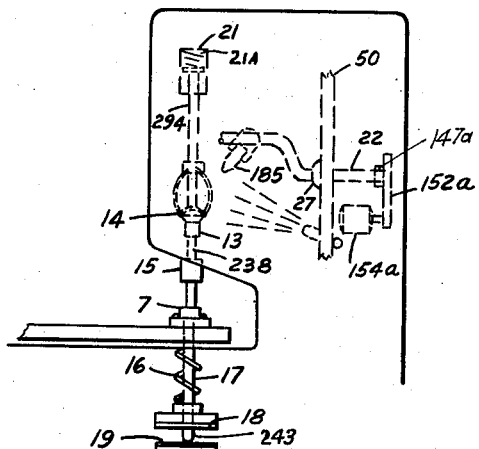
Fig. 5 is an enlarged view taken on line 5—5 of Fig. 3.
Figure 8:
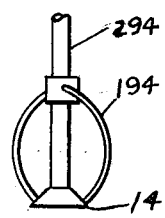
Fig. 8 is an enlarged view of the mask supporting device shown in the previous figures of the drawings.

When the rotary power units 25 and 25' are actuated, they will engage the leather washers 18 and 19 and lift the spindles 238 up and bring the article into engagement with the mask 14 and compress a resilient unit 21 (Fig. 5), therefore forming frictional engagement between the leather washer 19, and the frictional force therebetween will rotate the spindles 238 with the articles thereon as well as holding the article snugly up against the mask 14. A valve actuating member 430 on valve 432 will be adjusted so that it will be engaged by a movable frame 36 of the rotary power unit at the time the article engages the mask 14. This will allow air to flow from pipe 409 to pipe 411 which is connected to the paint guns. This will actuate the paint guns 185 and paint will be sprayed as the rotary power units 25 and 25' continue to rise, compressing a spring 21A in the resilient unit 21. The power units 25 and 25' continue to rise until the frame 40 strikes a limit switch 326, then breaks the circuit to a solenoid 117, and causes the frame 40 to move downwardly.

*Timer valves*

Figure 7:
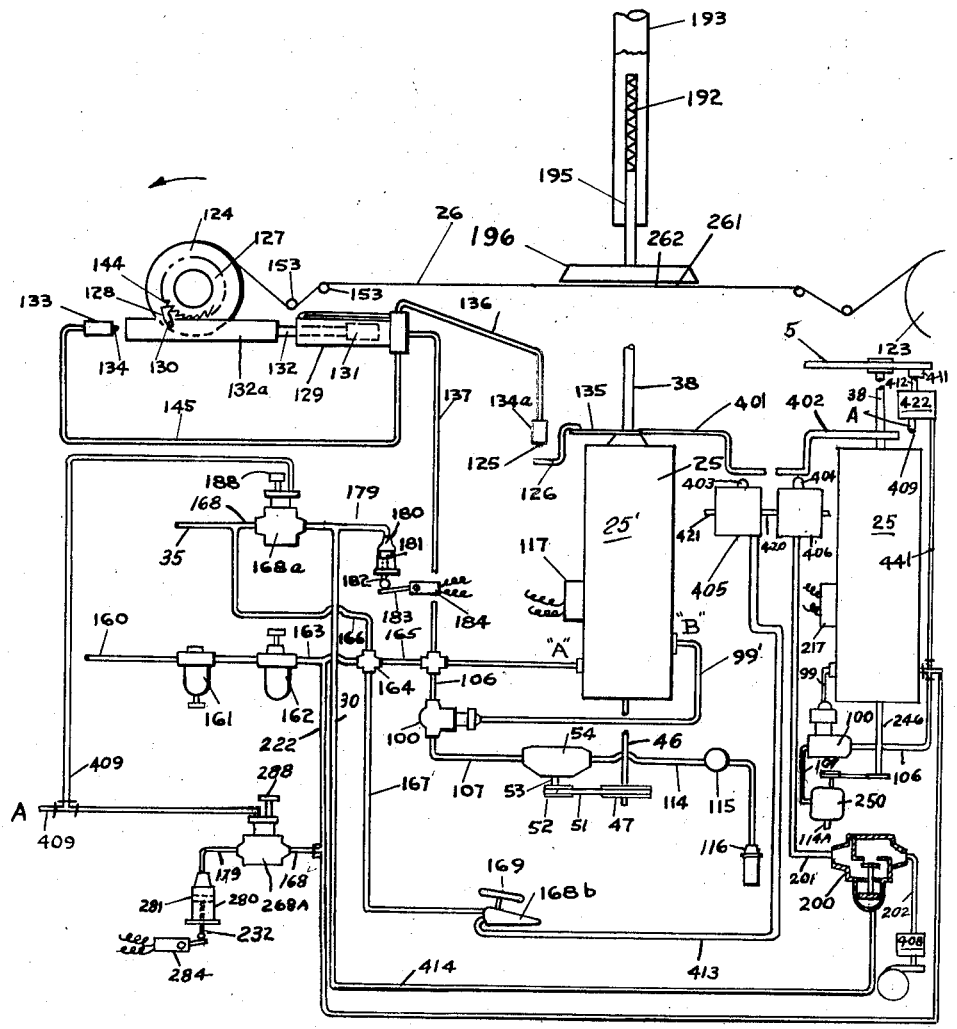
Fig. 7 is a piping diagram showing the air circuit which operates the mechanism with the components which lift the parts and/or supports upward into position to be operated on by the painting machine and by the wiping device.

Timer valves 168a and 268A are shown in Figs. 7 and 14 used in the actuating circuits for both painting and wiping and are made up of a body 189 having a partition 178 with an aperture therethrough. A piston 174 is slidable in a chamber 175 and urged to bring a shaft 176 with a valve 177 thereon to closed position to close the aperture in the partition 178. A chamber 173 above the piston 174 receives air from a pipe 170 through a check valve 17b to move the piston 174 and thereby open the valve member 177, thus allowing air to flow from a pipe 168 to a pipe 179. When air pressure is applied to the pipe 170, it flows into the chambers 172 and 173. Then when air pressure is shut off from the pipe 170, the air entrapped in the chamber 173 will force the check valve 17b to closed position. At this time, the piston 174 will be moved down to hold the valve 177 in open position. The air entrapped in the chambers 172 and 173 will then start bleeding out through a needle valve 188 through an orifice 187 at a predetermined rate controlled by the setting of the needle valve 188. Therefore, when the air pressure in the chambers 172 and 173 has been reduced to a pressure less than the force of a spring 174A, the piston 174 will be forced to the position shown in Fig. 14, thus closing the valve 177.

*Motor control valves*

Valves 100 (Fig. 16) are connected in the air circuit as shown in Fig. 7 and are made up of a body member having a piston 101 therein urged to the position shown by a spring 102 seated as shown. A pipe 99 connects air pressure to a chamber 101A above the piston 101 and a piston rod 103 connects the piston 101 to a valve member 104 which seats on a valve seat 105 around an orifice 105B in a partition 105A so that air can be stopped from flowing from a pipe 106 to a pipe 107 when the valve 104 is in the position shown and can be allowed to flow from the pipe 106 to the pipe 107 and then to a motor 54 or a motor 250 when the piston 101 is urged down by air pressure from the pipe 99.

*Fabric control valve*

The fabric control valve is shown in enlarged view in Fig. 15. The valve is made up of a piston 131 having a piston rod 132 attached thereto. The piston rod 132 is attached to a member having a pawl 128 thereon as shown in Fig. 7. Air from a pipe 137 flows either through a port 148 to a chamber 143 to force the piston 131 in the direction shown by the arrow in Fig. 15, or, when a valve member 140 is in the dotted line position 147, air will flow through an orifice 149 and a pipe 150 to a chamber 152 and pressure therein will push the piston 131 in the other direction. The pawl 128 is pivoted on a pawl support 132a attached by a pin 130. Therefore, the pawl 128 on one stroke of the pawl support 132a urges a ratchet 127 having teeth 144 thereon to roll the fabric up one position to supply a new piece of cloth between the article being wiped and a head 195 of a backup member 196. On the other stroke, the pawl 128 slips around the teeth 144 to obtain a new bite.

When the piston rod member 132 has moved to the extreme left position, the pawl support 132a engages a poppet valve 133, opening a valve member 134 and allowing air to exhaust from a pipe 145. This reduces the pressure in a chamber 139 and allows the pressure built up in a chamber 141 through an orifice 143a to urge the valve member 140 to the position shown. Therefore, air will flow through the pipe 137 through the port 148 to the chamber 143 to push the piston 131 back in the direction of the arrow shown in Fig. 15 and pull the pawl 128 with it over the teeth 144.

When the rotary power unit 25 has moved its shaft 38 to the upper position, a cam 126 will engage a poppet valve 125 of a valve 134a and exhaust air through a pipe 136. This will reduce the air pressure in the chamber 141 and, the pressure having built up in the chamber 139 through an orifice 138 from the pipe 137, the air pressure will force the valve member 140 to the dotted line position 147 shown in Fig. 15. As soon as the rotary power unit 25 moves down off the valve 134a, pressure will again build up in the chamber 141, causing the piston rod 132 to slide forward and causing the pawl 128 to obtain a new hold. This procedure is repeated on each cycle of the wiper rotary power unit 25'. That is, when the rotary power unit 25 reaches the upper position, the valve member 140 will move to the dotted line position 147 and advance the pawl 128. Then when the pawl 128 advances with the piston rod 132, the valve 134 will exhaust the pipe 145 and the rod 132 will be driven backward by the piston 131 to roll the cloth 26 to another space.

*Rotary power units*

The rotary power unit used at the painting station and shown in Fig. 12 is identical in many respects to the rotary power unit used at the wiping station shown in Fig. 19; however, for more clarity of showing in the drawings, the corresponding parts have identical numbers in Fig. 12 and Fig. 19 but in Fig. 19, a prime (') has been added to each index numeral to designate the two devices which are identical in some respects but different with regard to the operation of a valve 83 on one hand and a valve 83' on the other.

The unit 25 shown in Fig. 12 is used at the painting station and the unit 25' in Fig. 19 is used at the wiping station. The unit 25 shown in Fig. 12 is actuated by the solenoid 117 which, when energized, pulls a valve member 95 down to align a port 93 with pipes 94 and 96. The solenoid 117 will hold the valve member 95 in this position until the frame 40 has moved to its extreme top position where it will engage a detent 327 on the limit switch 326 which will open and deenergize the solenoid 117. A valve 432 actuates the paint guns 185 and is adjusted so that the valve member 430 engages the frame 40 thereon to start the spray guns 185 so they will spray paint as the frame 40 continues to move upward until it strikes the detent 327 and valve 326 and deenergizes solenoid 117 which cuts off air from pipe 96 and connects air to pipe 84 which causes piston 33 to cause the frame 40 to descend.

The rotary units 25 and 25' both have shafts 38 rotated by a motor through a belt 51 which engages a pulley 47 attached to a shaft 46. The shaft 38 is slidable in a spline 45 supported in a frame 50. The frame 50 is fixed in position and the movable frame 36 moves upwardly and downwardly relative thereto, lifted by a shaft 35 fixed thereto at 37 by means of a nut 38a and supported on the piston 33 attached to the shaft 35 at 36a.

The frame 36 is attached to the bottom frame member 40 by means of bolts 39 which are locked thereto by means of nuts 41 and 42, respectively. A dashpot made up of a piston 64 is movable in a cylinder 65 having a fluid chamber 66 thereabove which exhausts fluid into a tank 68 urging a liquid level 73 thereof to raise the fluid flowing through a needle valve 82 adjusted to regulate the size of an orifice 70, thereby regulating the flow through an orifice 71 and a pipe 72. Therefore, when the movable frame 36 moves up and the lower frame 40 engages a nut 108, from that point on, it moves the piston 64 therewith, exhausting fluid through the pipe 72 and into the tank 68 and thereby limiting the speed of travel of the table 5. On the downward stroke, the movable frame 36 moves down rapidly, bringing its leather washer 19 out of engagement with the leather washer 18 on the lower end of the shaft 238 until the frame member 40 strikes a nut 80. Then, from this point on, the piston 64 must draw fluid through a check valve 74 from the pipe 72, thereby limiting the downward movement of the movable frame 36 but allowing it to move downward at a more rapid rate than the upward movement at this point since the check valve 74 allows fluid to flow through as well as fluid flowing through the needle valve 82.

The movable frame 36 is moved up and down by the piston 33. When the frames 36 and 40 are in the positions shown in Figs. 12 and 19, they are in their at rest positions.

Operation of rotary power units

The operation of the valve 95' in Fig. 19 is exactly the same as the corresponding valve 95 in Fig. 12, the only difference between the operation of the two power units 25 and 25' being in the operation of the solenoids 117 and 117'. In Fig. 19, as soon as the solenoid 117' is actuated by energizing a switch 284', a trigger 110' is urged into a notch 91' by a spring 92'. This locks the valve 95' down. As soon as the frame 36' begins to move upward, the frame member 40' attached thereto moves off of a limit switch 118' and deenergizes the solenoid 117'; however, the valve 95' is held in position by the trigger 119'. As the frame 36' continues to move upward and the shaft 38' urges the spindle 238' up to bring the article supported thereon into engagement with the cloth 26', a cam 62' finally is moved up into position to engage the trigger 110' to pull the trigger 110' out of the notch 91'. A spring 110a' then pushes the valve 95' back to the position shown in Fig. 19 and the air passing through passages 81a', 85', and 84' to a space 34' above the piston 33' urges the rotary power unit 25' back to its position shown in Fig. 19.

The painting rotary power unit 25 operates similar to the wiping rotary power unit 25'; however, the valve 95 is held down when the solenoid 117 is energized. The solenoid 117 is energized through the normally closed switch 326 and when the normally open switch 284 is closed by a piston 281, that is, when the piston 281 is energized, the solenoid 117 will hold the valve 95 in open position until the lower frame member 40 engages the actuating member 327 of the switch 326 or until the timer valve 268A opens which will open the switch 284. At this point, the spring 110a will pull the valve 95 to a closed position, admitting air to the space 34 above the piston 33.

Paint gun oscillating means

While the article to be painted is being rotated on the spindle 238 under the mask 14 by the rotary power unit 25, the paint guns 185 are being operated. They are oscillated in a manner similar to the movement through which a painter moves his paint guns backward and forward with his hand. The paint guns 185 are clamped onto a crank 22. The crank 22 has a bearing 27 supporting the frame 50 therein and the crank 22 is attached to a lever 152a by means of a block 147a. The lever 152a has a slot 173a therein in which an eccentric 172a mounted on a motor 154a rotates to oscillate the crank 22 and, therefore, the gun 185.

Air circuits

The air circuits are made up of the following components: a cloth index cylinder 129, the wiper rotary power unit 25', the paint rotary power unit 25', the wiper timer valve 168a, the paint timer valve 268A, the motor 54 for driving the paint rotary power unit 25, the corresponding motor 250 for driving the wiper rotary power unit 25' a foot control switch 168b, the cylinders which control air to an index valve 200, an index mechanism 408, and limit switch cylinders 180 and 280.

Air is applied through the circuit through an input pipe 160 to a filter 161 and an oiler 162 by pipe 163 to the pipes 168, 137, 106, 166, 167, and 222. The operation of the various elements is explained in connection with the specific showing thereof and the various connections are shown in Fig. 7.

General operation

In operation, the operator will connect a source of compressed air to the pipe 160 and load an article to be painted on one of the spindles 238 adjacent the painting station. The frame 36 of the painting unit 25 and the frame 36' of the wiper unit 25' will be in the down position; that is, cams 401 and 402 will rest on valve actuating members 403 and 404. This will hold the valve members 403 and 404 open and since the valve members 403 and 404 are in series, air may flow therethrough and through the normally open valve 200 to the air actuated one revolution clutch indexing mechanism 408 when the operator actuates a foot control 169. The indexing mechanism may be of the type disclosed in Patent No. 2,140,737. This will cause the table 5 to index one position. As the table 5 indexes, a cam 411 which is fixed to the underside of the table and rotates therewith will strike an actuating member 412 and hold it open for an instant before the cam 411 passes over it. This will allow air to flow from a pipe 441 to a pipe 409 and charge the chamber 173 in both the timer valves 168a and 268A. Air will therefore flow through the timer valves 168a and 268A to depress the pistons 181 and 281 and thereby actuate the switches 184 and 284. The switches 184 and 284 will actuate the rotary power units 25 and 25' for both painting and wiping as aforedescribed. When the power units 25 and 25' start to raise their frames 36 and 36', air flowing from the spaces 97 and 97' in the power units 25 and 25' through the pipes 99 and 99' will start air motors 54 and 250 to start the shafts 38 and 38' rotating. As the frame 36 of the painting rotary power unit 25 moves upward at the time the article on the spindle 238 nests in the mask 14 on the frame 40, it will first strike the valve member 430 which will start the paint gun 185 operating and as the shaft 38 continues to move upward, compressing the spring 21A in the resilient member 21, it will finally strike the limit switch 326, deenergizing the solenoid 117 and stopping the upward movement.

As mentioned previously, the wiper rotary power unit 25' will also continue to move upward, compressing the spring 16 until the cam 62' retracts the trigger 110'. When the wiper rotary power unit 25' has reached the top of its stroke, the cam 126 will strike the detent 125 on the valve 134a' and cause the cloth to index ahead one position as explained previously. The wiper rotary power unit 25' will then descend and if the wiper timer valve 168a is adjusted so that the chamber 172' still retains enough pressure to hold the valve 177' open at the time the rotary power unit has descended, the switch 134 will still be closed and when the frame member 46' again rests on the limit switch 118', a circuit will again be completed through the solenoid 117' which will again be energized and the wiper will repeat.

Regardless of the setting of a needle valve 288 of the paint timer valve 268A, the paint cycle will not repeat because as soon as the frame 36 begins to descend, the frame 40 will move off of the detent member 327 and again energize the solenoid 117 which will hold the paint rotary power unit 25 up until the timer valve 268A times out. The painting rotary power unit 25 will then descend.

The table 5 cannot index until the wiper timer valve 168a has timed out because as long as the wiper timer valve 168a is allowing air to flow through the pipe 179, air is also flowing through a pipe 414 and holding the normally open valve 200 closed, thereby preventing air from flowing from a pipe 201 to a pipe 202 so that the wiper will continue to wipe through one cycle after the other until the timer valve chamber 172 has its pressure reduced so the spring 174A closes the valve 177. Therefore, the wiper can be set for two or more cycles by adjusting the needle valve 188.

The machine can be used either as a wiping machine or as a painting machine without the other function by opening up the timer needle valve 188 or 288 on the part which is desired to be inactivated.

Due to the spacing between the spindles 238 on the table 5 and the fact that there are six spindles around the table 5 and two diametrically opposite spindles 238 are always disposed under the wiping and painting mechanism when the machine 1 is operating, the paint on the parts disposed on the spindles 238 between the said diametrically opposite spindles will dry in the time that the parts move from the paint station to the drying station. On the opposite side of the machine 1, the operator will be standing adjacent the other two spindles between the painting and wiping stations and he may load one said station with one hand and unload the other station with the other hand.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A painting machine comprising a frame, a painting station and a wiping station on said frame spaced from each other, a table rotatable in a horizontal plane on said frame, said table having spaced spindles adjacent the periphery thereof, said spindles being movable upwardly and freely rotatable on said table, indexing means to rotate said table and selectively stop it with one said spindle in operative relation with said painting station and another said spindle which has previously been in operative relation with said painting station in operative relation with said wiping station, said painting station having a rotatable spindle supported above said table with a mask thereon, a rotary power unit disposed below said painting station and another disposed below said wiping station, said rotary power units having clutch means thereon adapted to engage clutch means on the lower end of each said spindle, said rotary power unit at said painting station having means thereon to lift said spindles to raise said spindles and articles adapted to be supported thereon into operative engagement with said mask, a paint gun supported on said frame, means to actuate said paint gun and to oscillate said paint gun whereby paint is sprayed on said article as it rotates, a spindle under said wiping station having means thereon engageable by said wiping rotary power unit whereby said spindle under said wiping station is lifted to bring an article supported thereon into engagement with said wiping station, said wiping station comprising two spaced rollers supporting a strip of fabric material with a bight portion therebetween, and means to unroll said material from one said roller and roll it onto the other said roller, said article engaging said bight portion of said fabric material while being rotated by said wiping rotary power unit.

2. The machine recited in claim 1 wherein a backing member engages said fabric material to urge it toward said article as said article is lifted into engagement with said fabric material.

3. The machine recited in claim 1 wherein said means to roll said material comprises an indexing means synchronized with the movement of said rotary power units whereby said material is rolled during times where said spindles are out of engagement with said material.

4. The machine recited in claim 3 wherein a backing member engages said fabric material to urge it toward said article as said article is lifted into engagement with said fabric material.

5. The machine recited in claim 4 wherein said rotary power units are actuated by air pressure means.

6. The machine recited in claim 5 wherein an air actuated timer is connected by said air pressure means to stop said paint guns and lower said spindles after a predetermined time.

7. A painting machine comprising a disk shaped table, four equally spaced spindles rotatably and axially slidable in said table, each said spindle having means thereon to support an article to be painted, a shaft rotatably supported and axially slidable on said machine, resilient means urging said shaft to a lowermost position, a paint mask comprising a counterpart of an article to be painted supported on said shaft, a wiping means comprising a fabric strip supported on two spaced rotatable spools supported on said machine above said table and diametrically opposite said shaft, a backing member engaging the bight portion of said fabric, resilient means to urge said backing member downwardly, two rotary power units, one said power unit having an upwardly extending shaft in substantial alignment with said rotatable shaft and the other said rotary power unit having a shaft in alignment with said backing member, index means to progressively move said table to stop it with one said spindle in alignment with said rotatable shaft and another said spindle which has previously been at said rotatable shaft in alignment with said backing member, and means to spray material on said article in said mask, said rotary power units rotating said spindles in engagement with said wiping means and said article in engagement with said mask while said material is being sprayed on said mask and said article, said painted articles being subsequently wiped when said table indexes to bring them to said fabric.

References Cited in the file of this patent

UNITED STATES PATENTS

| | | |
|---|---|---|
| 1,981,149 | Parker et al. | Nov. 20, 1934 |
| 2,141,630 | Westin | Dec. 27, 1938 |
| 2,149,293 | Howlett | Mar. 7, 1939 |
| 2,150,462 | Schultz et al. | Mar. 14, 1939 |
| 2,358,258 | Schweitzer | Sept. 12, 1944 |
| 2,426,391 | Emerson | Aug. 26, 1947 |
| 2,434,176 | Potthoff | Jan. 6, 1948 |
| 2,600,846 | Casler | June 17, 1952 |